United States Patent [19]

Tamura

[11] 3,896,494

[45] July 22, 1975

[54] AIR BEARING HEAD SUPPORT DEVICE FOR MULTI-CHANNEL DISC MEMORY APPARATUS

[75] Inventor: Teizo Tamura, Katsuta, Japan

[73] Assignee: Hitachi, Ltd., Japan

[22] Filed: Jan. 15, 1974

[21] Appl. No.: 433,437

[30] Foreign Application Priority Data

Jan. 16, 1973 Japan .................................. 48-6651

[52] U.S. Cl. .................... 360/103; 360/97; 360/109

[51] Int. Cl. .. G11b 5/60; G11b 21/24; G11b 17/02

[58] Field of Search ................................ 360/97–99, 360/103, 109

[56] References Cited

UNITED STATES PATENTS

| | | | |
|---|---|---|---|
| 2,897,288 | 7/1959 | Wijchman | 360/109 |
| 3,430,006 | 2/1969 | Taylor et al. | 360/103 |
| 3,657,711 | 4/1972 | Thiaffey-Rencorel | 360/103 |
| 3,754,104 | 8/1973 | Piper et al. | 360/103 |

*Primary Examiner*—Bernard Konick
*Assistant Examiner*—R. S. Tupper
*Attorney, Agent, or Firm*—Craig & Antonelli

[57] ABSTRACT

An air bearing head support device in multi-channel memory apparatus for recording and reproducing wideband information such as video signals on a magnetic disc, using a plurality of magnetic head assemblies or transducers. A head assembly supports at least two magnetic head cores sweeping the disc along alternate channel tracks. The other head assembly supports at least two magnetic head cores sweeping the disc along channel tracks between said alternate channel tracks. These plural head assemblies are attached to a common plate so that rotation trajectories produced on the disc by the magnetic head cores in the head assemblies at the time of the rotation of the disc do not overlap each other.

7 Claims, 5 Drawing Figures

AIR BEARING HEAD SUPPORT DEVICE FOR MULTI-CHANNEL DISC MEMORY APPARATUS

BACKGROUND OF THE INVENTION

1. Field of the Invention

This invention relates to a head attaching device in multi-channel memory apparatus for recording and reproducing wideband information such as video signals on a magnetic disc, using a plurality of magnetic head assemblies or transducers.

2. Description of the Prior Art

It has been found that, in the recording and playback of video signals on a rotating disc, with multi-channel memory apparatus wherein a head corresponding to one channel track on the disc is gradually moved from the outside to the inside on the disc, the precise repositioning of the head to the previously recorded track is difficult.

It has been also found that, in multichannel memory apparatus wherein heads of the number corresponding to that of channel tracks are arranged in one row in the radial direction of the disc within the same block or unit, since the disc has different relative speeds at its inside and outside, such multi-head assembly tends to incline with respect to the disc surface at the time of the floatation of the milti-head assembly from the disc surface due to the flow of air produced upon rotation of the disc, whereupon a head corresponding to the outermost channel track and another head corresponding to the innermost channel track are greatly shifted from their respective intended sweeping location, and, therefore, an unsuitable floatation of the heads is produced, so that very satisfying recording and reproducing are not obtainable.

SUMMARY OF THE INVENTION

Therefore, one object of the invention is to provide a head attaching device in multi-channel memory apparatus wherein a suitable floatation is provided between the heads in the multi-head assembly.

Another object of the invention is to provide a head attaching device in multi-channel memory apparatus wherein the height of the heads from the disc can be adjusted.

Still another object of the invention is to provide a head attaching device in multi-channel memory apparatus wherein a precise adjustment of the heads to the corresponding head locations is obtainable.

Other objects of the invention will be understood from the following description of an embodiment of the invention shown in the accompanying drawings.

DESCRIPTION OF THE PREFERRED EMBODIMENT

Figure 1:
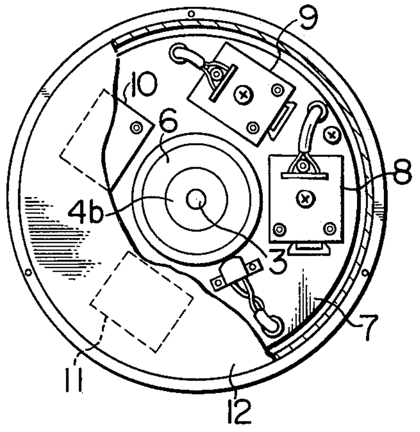
FIG. 1 is a top plan view of the multi-channel memory apparatus with the head attaching device of the invention, with the top cover of the apparatus removed.
Figure 2:
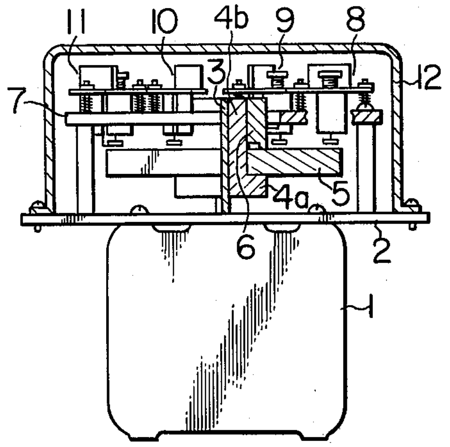
FIG. 2 is a fragmentary, sectional side view of the apparatus illustrated in FIG. 1.

In FIGS. 1 and 2, an electric motor 1 is shown fixed to the underface of a base plate 2, with its motor shaft 3 extending upwardly through a hole (not shown) of the base member 2. Fixedly attached to the motor shaft 3 is a disc receiving member 4 having a portion 46 extending along the length of the motor shaft and a flange portion 4*a* on which a disc 5 is adapted to be mounted. The disc 5 is forced down and held in place by means of a disc pressing member 6. The disc pressing member 6 has an inner thread portion and is adapted to be threadedly advanced downwardly along a corresponding outer thread portion of the extending portion 4*b* of the disc receiving member until the lowermost end of the disc pressing member contacts with the disc 5. Disposed above and parallel the disc 5 is a circular plate 7 with four head assemblies 8, 9, 10 and 11 attached fixedly. It is noted that the disc receiving member 4, the disc 5, the disc pressing member 6 and the head assembly supporting plate 7 are all concentric with respect to the motor shaft 3, but only the plate 7 is stationary with respect to the shaft 3 and the other driven elements 4, 5 and 6. A cover 12 is shown attached to the base member 2.

Four head assemblies 8, 9, 10 and 11 are all the same in construction and therefore a detailed description as to only one head assembly will be made hereunder by using FIGS. 4 and 5. A head base-plate 20 is attached to the attaching plate 7 which is stationary with respect to the disc 5 driven by the motor shaft 3. This attaching is made by three elongated screws 22*a*, 22*b* and 22*c* extending through respective slots 20*a*, 20*b* and 20*c* provided in the head base-plate 20 at the positions defined by the apexes of a large triangle on the plate 7 and corresponding small circular holes 7*a*, 7*b* and 7*c* provided in the plate 7. The purpose of these slots will be described hereinunder. The elongated screws 22*a*, 22*b* and 22*c* have respective coil springs 21*a*, 21*b* and 21*c* biasing between the plate 7 and the base-plate 20. The distance between the plate 7 and the base plate 20 along the length of each of the screws 22*a*, 22*b* and 22*c* can be adjusted by the respective nuts 23*a*, 23*b* or 23*c* engaged with the screw at its extruding end extending from the base-plate 20. A downwardly bent portion 202 of the base-plate 20 has an upwardly bent portion of a leaf spring 24 supporting a core holder 25 attached thereto by a screw. The core holder 25 is provided with a boss 26 at the point of gravity of the core holder 25. This core holder also has three magnetic head cores 27*a*, 27*b* and 27*c* at the positions thereon corresponding to apexes of an isosceles or equilateral triangle so that the position of the boss 26 coincides with that of the point of gravity provided by three magnetic head cores. The core holder 25 is made of material, such as steatite (coefficient of expansion $9 \times 10^{-6}$ deg$^{-1}$; hardness about 1,000 HY), similar to that of the magnetic head cores 27*a*, 27*b* and 27*c* which may comprises a ferrite material (coefficient of expansion $9 - 10 \times 10^{-5}$ deg$^{-1}$; hardness 700 – 800 HY). A head base cylinder 28 is positioned above the boss 26. This vertical hollow cylinder 28 is fixed at its upper end to the underside of the head base-plate 20. A coil spring 29 is accommodated within the cylinder 28 in a vertical form, with its upper end being connected to a washer 30 contacted with a screw 31 extending through a threaded hole of the head base-plate 20 to an integral head portion. The other end of the spring 30 comes into the channel of the boss 26 vertically and at that plate it is fixed to the holder 25 by a binding agent included in the channel of the boss 26. With this arrangement, it will be clear that by adjusting the head portion of the screw 31 the biasing force of the spring 29 against the holder 25 is variable so as thereby to provide an adjustment of the distance between the holder 25 and the disc 5. It is desired that the holder 25 is made as thin as possible through experimentation as to the characteristics of floatation of the head cores upon rotation of the disc 5, it has been determined the holder 25 of thickness of 0.6 – 0.4 mm is the most suitable.

Figure 3:
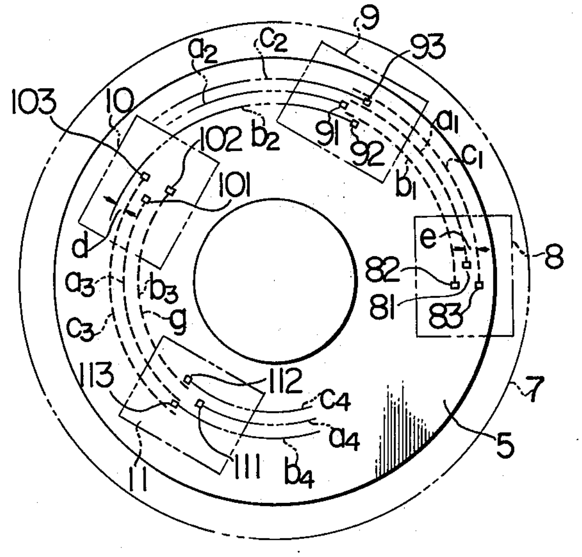
FIG. 3 is a schematic plan view for explaining the relative position relationship between the head cores.
Figure 4:
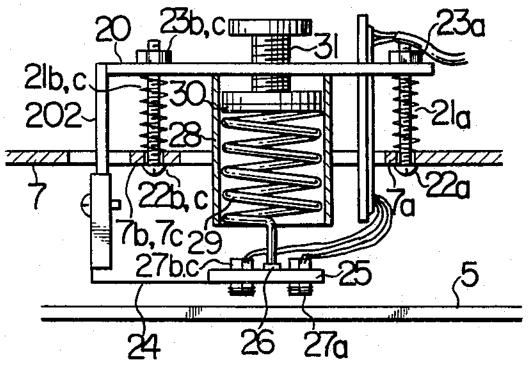
FIG. 4 is an enlarged sectional view showing the attaching of one head assembly.
Figure 5:
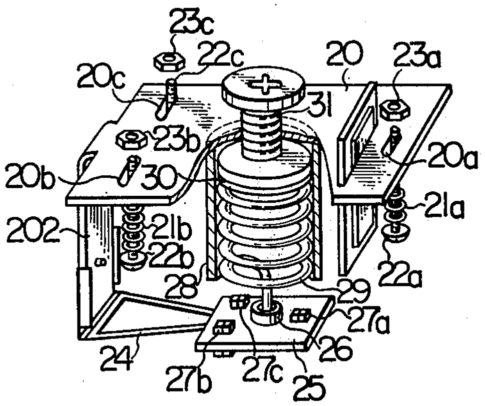
FIG. 5 is a perspective view of one head assembly.

FIG. 3 shows the relationship of disposition between four head assemblies in the same construction arranged on the common plate 7, each of which may be identical to that just mentioned in connection with FIGS. 4 and 5. In FIG. 3, for the purpose of simplification of the drawing, a first head assembly is shown with magnetic head cores 81, 82 and 83 alone; a second head assembly 9 shown with magnetic head cores 91, 92 and 93 alone; a third head assembly 10 shown with magnetic head cores 101, 102 and 103 alone; and a fourth head assembly 11 shown with magnetic head cores 111, 112 and 113 alone. The magnetic head cores 81, 82 and 83; 91, 92 and 93; 101, 102 and 103; and 111, 112 and 113 of the respective head assemblies have, at the time of the rotation of the disc 5, rotation trajectories *a*1, *b*1 and *c*1; *a*2, *b*2 and *c*2; *a*3, *b*3 and *c*3; and *l*4, *b*4 and *c*4, respectively, on the rotating disc. In accordance with this invention, the first and second head assemblies 8 and 9 are attached to the plate 7 so that the rotation trajectory *c*2 is positioned between the rotation trajectories *c*a and *a*1 and also *a*2 between *a*1 and *b*1. Therefore, the first and second head assemblies 8 and 9 each sweeps a total of three alternate tracks on the disc. The same relationship of disposition between the head cores 101, 102 and 103 of the third head assembly 10 and the head cores 111, 112 and 113 of the fourth head assembly 11 is established. Further, in accordance with this invention, the second and third head assemblies 9 and 10 are disposed on the plate 7 so that the innermost rotation trajectory *b*2 of those of the second head assembly 9, as formed by the inside head core 92 is positioned in the outside of the outermost rotation trajectory *c*3 of those of the third head assembly 10, as formed by the outside head core 103. In this connection, the distance *d* between the trajectories *b*2 and *c*3 is selected to become greater than the distance defined by the adjacent trajectories in each head assembly, such as *e* between the rotation trajectories *a*1 and *c*1.

In this invention, since a plurality of head assemblies are attached to the common plate with one having at most three magnetic head cores, there will be substantial little difference between the magnetic head cores in one head assembly in the rate of floatation.

Also, each of the head assemblies 8, 9, 10 and 11 can be prepared as a sub-assembly or unit excluding the coil spring 21*a*, 21*b* or 21*c*, the screw 22*a*, 22*b* or 22*c*, and the nut 23*a*, 23*b* or 23*c*, shown in FIG. 5. Therefore, the frequency characteristics of the magnetic head cores of each of these sub-assemblies can be individually determined. The head cores in the outside head assembly and those in the inside head assemblies with respect to the rotating disc have the different relative speeds each other. Thus, in accordance with this invention, with mere selection of an arrangement of the sub-assemblies, an equality in characteristic between recordings or reproducings of the channel tracks on the disc is obtainable. For example, in the embodiment of this invention, the highest grade sub-assembly is used as the fourth head assembly 11, and according to the grade of the sub-assembly it is used as the outer head assembly.

Also, in this invention, after the head assemblies were attached to the plate, an adjustment in the relative position relationship between the plate 7 and the sub-plate 20 can be effected. For example, in FIGS. 4 and 5, by turning at least one of the screws 22*a*, 22*b* and 22*c*, the distance between the plate 7 and the base-plate 20 and/or the inclination of the latter with respect to the former can be adjusted. At that time, since the screws 22*a*, 22*b* and 22*c* are movable within the respective slots 20*a*, 20*b* and 20*c* in the base plate 20, a precise adjustment of such relative position relationship is obtainable, so that the magnetic head cores can be precisely positioned to the corresponding disc locations.

In the embodiment of this invention, since the distance *d* between the innermost rotation trajectory *b*2 of those of the second head assembly 9 and the adjacent outermost rotation trajectory *c*3 of those of the third head assembly 10 is selected to become greater than the given distance *e* between the adjacent rotation trajectories formed by the heads in the same head assembly, the overlapping of the rotation trajectories of the second head assembly with those of the third head assembly is prevented, because the precise adjustment of the magnetic head core of a pair of head assemblies (in the illustrated example, the first and second head assemblies 8 and 9, the third and forth head assemblies 10 and 11) to the corresponding disc locations will be effected at one time.

Further, the biasing force of the coil spring 29 which biases the holder 25 supporting the magnetic head cores, in the direction of the disc can be adjusted by turning the head portion of the screw 31 shown in FIGS. 4 and 5.

The embodiment of this invention shows four head assemblies 8, 9, 10 and 11 each having three active magnetic head cores so that the recording and reproducing of twelve channel tracks in total are possible, but the active magnetic heads can be used as needed. For example, if an eleven channel track recording or reproducing is desired, one of three head cores of any one head assembly is formed as a dummy member of the same material as the active magnetic head cores.

I claim:

1. An air bearing head support device for multichannel disc memory apparatus comprising:

a rotatable magnetic storage disc;

a fixedly mounted support plate spaced above said disc;

at least three head base-plates, each base-plate having a downwardly bent portion and a hollow head-base cylinder extending toward said disc, respectively, each of said base-plates being connected to said support plate at three positions defined by apexes of a triangle having at least two equal sides by three indepdendently adjustable members, whereby each of said base-plates is adjustable in position and distance with respect to said support plate;

at least three core holders, each of said core holders being connected to a respective base-plate by a leaf-spring, said leaf-spring having one end connected to said core holder and another end connected to the downwardly bent portion of said base-plate, each core holder having three head cores at positions thereon defined by apexes of a triangle having at least two equal sides, a first and a second core holder being arranged in a pair so that at the time of rotation of the disc the rotation trajectories on the disc produced by the head cores on the first core holder and the head cores on the second core holder are alternately positioned, a third core holder being arranged so that mutually adjacent rotation trajectories on the disc produced by a head core of the third core holder and a head core of one of the first and second core holders are separated by a distance larger than that of mutually adjacent rotation trajectories on the disc produced by the head cores of one of the first, second and third core holders; and a coil spring and an adjusting element accommodated within the hollow head-base cylinder of each base-plate, said coil spring having a downwardly extending lower end connected to the core holder at the point of gravity of the triangle of the head cores and an upper end connected to the adjusting element, the adjusting element being adjustably mounted to the base-plate at the point of gravity of the triangle of the independently adjustable members, whereby each core holder is maintained apart from an coplanar to the disc surface by at least a portion of the leaf-spring, the coil spring and air bearing force produced due to rotation of the disc.

2. A head support device according to claim 1, wherein said adjusting element includes a screw member threadedly engaged with the head base-plate and movable in relation thereto so as to provide a variable pressing force to the upper end of said coil spring.

3. A head support device according to claim 1, wherein said three head cores are three active magnetic cores at positions corresponding to the three apexes of the triangle on said core holder.

4. A head support device according to claim 1, wherein the apexes of the triangle on the head base-plate are spaced apart a greater distance than the apexes of the triangle on the core holder, said three independently adjustable members being three spring biased screw elements extending through respective holes in the head base-plate at the three positions defined by the apexes of the triangle and corresponding holes in the support plate, the spring of each screw being arranged between the support plate and the base-plate, whereby an adjustment of the vertical position and inclination of the head base-plate with respect to the support plate is provided.

5. A head support device according to claim 4, wherein the holes in the head base-plate are slots extending radially of the disc, whereby a precise adjustment of the head cores in relation to the corresponding disc locations is provided.

6. A head support device according to claim 1, wherein said three head cores on one of said core holders are three active magnetic cores positioned at locations corresponding to the three apexes of the triangle of said one core holder and the three head cores of another core holder includes two active magnetic cores positioned at locations corresponding to two apexes of the triangle on said other core holder and a dummy head core member being positioned at the location of the remaining apex of the triangle on said other core holder.

7. A head support device according to claim 6, wherein said dummy head core member is formed of the same material as the active magnetic head cores.

* * * * *